(12) United States Patent
Von Trotha et al.

(10) Patent No.: US 8,647,414 B2
(45) Date of Patent: Feb. 11, 2014

(54) APPARATUS AND PROCESS FOR THE SEPARATION OF PROCESS CONDENSATE IN STEAM REFORMING

(75) Inventors: Thilo Von Trotha, Selm (DE); Julia Raab, Dortmund (DE); Ernst Sichtermann, Dortmund (DE)

(73) Assignee: UHDE GmbH, Dortmund (DE)

( * ) Notice: Subject to any disclaimer, the term of this patent is extended or adjusted under 35 U.S.C. 154(b) by 693 days.

(21) Appl. No.: 12/736,372

(22) PCT Filed: Mar. 18, 2009

(86) PCT No.: PCT/EP2009/001978
§ 371 (c)(1),
(2), (4) Date: Dec. 17, 2010

(87) PCT Pub. No.: WO2009/121479
PCT Pub. Date: Oct. 8, 2009

(65) Prior Publication Data
US 2011/0120680 A1 May 26, 2011

(30) Foreign Application Priority Data

Apr. 4, 2008 (DE) .......................... 10 2008 017 525

(51) Int. Cl.
*B01D 46/00* (2006.01)
(52) U.S. Cl.
USPC ............... 95/214; 95/226; 95/228; 96/351; 96/355; 62/55.5; 62/615; 62/640
(58) Field of Classification Search
USPC .............. 95/149, 214, 226, 228, 237; 96/243, 96/351, 355; 165/128; 62/55.5, 615, 632, 62/640
See application file for complete search history.

(56) References Cited

U.S. PATENT DOCUMENTS

| | | | | |
|---|---|---|---|---|
| 2,198,142 A | * | 4/1940 | Wade | 62/632 |
| 2,715,948 A | * | 8/1955 | Lewis et al. | 95/169 |
| 5,907,924 A | | 6/1999 | Collin et al. | |
| 2005/0265919 A1 | | 12/2005 | Lomax et al. | |

FOREIGN PATENT DOCUMENTS

| | | |
|---|---|---|
| DE | 42 00 990 A1 | 7/1993 |
| DE | 10 2004 026 908 A1 | 12/2005 |
| EP | 0 029 033 A1 | 5/1981 |
| WO | WO 2005/118466 A2 | 12/2005 |

* cited by examiner

*Primary Examiner* — Robert A Hopkins
(74) *Attorney, Agent, or Firm* — Marshall & Melhorn, LLC (57) ABSTRACT

An apparatus is provided for drying a gas by gradually releasing and condensing the moisture in various chambers of a column, different pressures and different temperatures thus being present in the chambers of the column. The gas to be dried is first fed into the bottom chamber, where the largest amount of the water contained in the gas is condensed, and the gas is then discharged from the bottom chamber via a nozzle. Subsequently the gas is cooled and fed into at least one more chamber located above the first chamber, where further moisture is condensed before the resulting condensate is fed via a pipe—preferably shaped like a siphon—into the bottom reservoir to prevent the gas from flowing from the chamber below into the chamber above. A process which enables a gas to be dried is also described.

32 Claims, 7 Drawing Sheets

APPARATUS AND PROCESS FOR THE SEPARATION OF PROCESS CONDENSATE IN STEAM REFORMING

BACKGROUND OF THE INVENTION

The invention relates to an apparatus for drying reducing gas. The invention facilitates the drying of reducing gases at various temperature and pressure levels in a space-saving single column. The apparatus allows for the drying process, in which the water contained in the reducing gas condenses, to be carried out in stages and the condensate formed to be collected in a combined receiver without the need for pressure regulating devices. The invention also relates to a process which enables reducing gases to be dried in stages at various temperature levels.

Product gases are generated during the production of reducing gases as a result of the process. These gases contain a relatively large amount of evaporated water. Examples of reducing gases are synthesis gas, hydrogen, $C_3$ and $C_4$ hydrocarbons. At the end of a steam reforming process synthesis gas contains, for example, even larger quantities of water vapour, which have not been completely converted and which are present as steam at the high formation temperature of the synthesis gas. Consequently fresh synthesis gas produced in a reforming process can contain more than 25 mass percent of water vapour. In general, this is not desirable for the following processes and so the water vapour must be precipitated out of the gas. Other reducing gases also often contain water vapour. Many gases are also treated in a gas scrubbing process. Following this process water vapour is present as steam in the gas.

For this reason it is common to use processes in which gases can be dried. Drying is usually effected using a cooling process in which the water contained in the gas condenses. During this process the temperature of the gas is first lowered to normal temperature so that the majority of the water contained in the gas condenses out. In a subsequent stage, the gas can be cooled even further using a refrigerating unit so that undesirable impurities, such as methane or ammonia, can be separated out with the water. However, this process is very costly as it requires the use of a refrigerating unit and the liquid gas obtained has to be fractionated so that it can be put to subsequent use.

The temperature of the gas is often lowered gradually to normal temperature. This causes the pressure of the gas to fall accordingly. The water contained in the gas condenses gradually so that it can be dried more effectively. In the gradual cooling process, maintaining the gas flow in the process flow usually requires a complex arrangement of valves, pumps and pressure-regulating devices. In addition, it is often necessary to use several condensers and separators in series, which is costly and uses a lot of plant space.

WO 2005118466 A2 describes a process for manufacturing hydrogen which originates from synthesis gas. To this end the water-bearing synthesis gas obtained is cooled in a condenser and then fed into a second cooling system. This causes the water to condense gradually. The second cooling system is cooled using a cooling agent which is fed through a cooling reservoir, which can be embedded underground and which exploits the high thermal capacity of the surrounding subsurface. The water is then removed from the synthesis gas obtained using a water separator. Another drying device is then used to remove the remaining water traces. In this way the synthesis gas can be cooled gradually and the water largely removed.

However, the construction of the apparatus is very expensive as it requires several condensers and separators which must be connected in series, one of which may be connected to a cooling reservoir embedded underground. Consequently, the apparatus used for condensing the water requires a lot of space in itself. When implementing the process, additional cooling agent may be required to allow the gas to be condensed gradually. This is prone to problems and involves high investment costs. In addition, no indication is given as to how the gas has to be conducted to prevent it from flowing back into the separators located upstream in the process flow.

For this reason the task at hand is to make available a space-saving device which enables the temperature of a reducing gas to be gradually lowered so that the moisture contained within the gas can be gradually condensed. In so doing the pressure differences occurring must be compensated for without costly regulating devices, if possible. It should also be possible, if required, to use refrigerating machines to ensure that the water is condensed out completely. In principle, the apparatus should be able to be used for any reducing gas where it would be feasible to apply the gradual condensation process to release the water. It should also be possible to collect the condensed water in a common receiver without costly sluice devices.

BRIEF SUMMARY OF THE INVENTION

The invention uses a column divided into several chambers to meet the requirements of this task. The chambers are physically connected using pipes so that the liquid can flow back into the lower chamber from which it is discharged. The chambers can also be described as condensation chambers. Ideally the pipes should be in the form of a siphon so that the liquid in the pipe can flow back and uncontrolled gas backflow is prevented during device down-times. The liquid in the pipes can also seal the chambers against each other if the pressure level between the chambers is balanced. Then again, if the pressure levels are different the liquid can flow back even during plant operation. The column represented in the invention contains at least two chambers arranged on top of each other.

The actual cooling mainly occurs outside the column. After this cooling stage the gas is fed into the chamber which is situated above the previous cooling stage. This allows for refrigerating machines to be used as well if required. It is recommended that the lowest chamber, in which the majority of the condensation water is collected, is closed at the bottom by a closing device. This can be a valve, for example. This allows the condensation water to be removed and collected in a common receiver.

A claim is made in particular for an apparatus for cooling a gas which is formed by means of a column surrounded by a pressure shell which is characterised in that:

the column comprises at least two separate chambers, the first, bottom chamber being closed at the bottom by means of an outlet which can be shut off using a valve, thus allowing a bath with liquid to be installed in this chamber—said chamber having a side inlet for the reducing gas, and the first, bottom chamber being closed at the top by a chamber roof and having a gas outlet, and the second, upper chamber being closed at the bottom by the chamber roof of the first chamber, with said upper chamber having another side gas inlet and being closed at the top by an outlet for the synthesis gas, and it being possible to heat these chambers to different temperature levels and to pressurise or create a vacuum in these chambers such that different pressure levels can be set, and a hydrostatic liquid column or a siphon-like physical connection, which can be filled with liquid, being integrated between the chambers.

For the construction of the column the bottom chamber has a roof which serves simultaneously as the floor of the chamber above. The gas outlet from the lower chamber is situated in the upper section at the side. Alternatively the roof is fitted with a pipe which is directed into the upper chamber and which does not allow the gas to flow into the upper chamber, but rather branches off to the side and conducts the gas out to the side of the column. By contrast, the upper chamber is fitted with a gas outlet, which preferably lets the gas out at the top and can be closed off using a valve, if required. The gas can be fed in via gas lines which are located in the upper section of the respective chamber and which preferably enter the column transversely from the side. The chambers can be heated or cooled. This is discretionary. Heating options include electric heating, or heating by means of hot gas or steam. Cooling internals can also be used.

DETAILED DESCRIPTION OF THE INVENTION

In a preferred embodiment of the invention the column has two chambers arranged on top of each other. However, it is also possible for the column to have three chambers arranged on top of each other. In this case, the roof of a chamber creates the floor of the chamber above it. The gas is preferably let out by conducting it through the roof of a respective chamber and then discharging it off to the side without the gas to be dried entering the chamber above. The individual chambers are physically connected via a pipe which can be of a simple design. The height of the liquid column is defined by the pressure difference between the chambers. The installation of this column enables the condensate to flow back into the chamber below. The pipes can connect chambers which are on top of each other as well as non-adjacent chambers by going through other chambers. For example, there can be a pipe between the first, bottom chamber and the third chamber, for example.

In principle the column can have as many chambers as required. The roof of a chamber always functions as the floor of the chamber above. The gas is preferrably discharged upwards and out to the side via a pipe through the chamber roof without the gas entering the chamber above. Preferably, only the gas outlet in the upper chamber is designed to discharge the gas directly above. As, for the most part, relatively large amounts of condensate occur in the bottom chamber, the chamber can be very large. The physically connecting pipe can be in the form of a siphon so that a residual volume of liquid remains in the pipe. This prevents gas exchange between the chambers.

Once the gas has been discharged from a chamber it is fed via pipelines to a cooling device. This can be an air cooler or a water cooler. The gas is fed through an air cooler, for example, if it is at a higher temperature or there is a larger quantity. The gas should be fed through a water cooling device if there is a smaller quantity or the temperature is lower. As the gas is to be dried it is recommended that it be cooled indirectly using cooling coils or heat exchangers. Direct cooling via sprinkling, e.g. using liquid fed in from outside, can also form part of the invention. If the gas is to be dried to a few ppm water or if external temperatures are frequently high, a refrigerating machine can also be used as the cooling device.

A droplet separator or a demister can be installed in the upper chamber if the gas to be dried still contains a residual amount of water. In principle, a droplet separator or a demister can be installed in the other chambers; however, this is usually only necessary in the upper chamber due to the different moisture content of the gas.

The physical connection between the chambers can be in the form of a simple pipe. However, the pipe can also be in the form of a siphon, in which case gas exchange between the chambers can largely be prevented. The siphon-type configuration ensures that there is always residual liquid in the column so that if there is a stoppage, it is not possible for gas exchange to occur between the chambers. However, the physical connection can take any form, for example even conical or cylindrical.

The pipe can be placed in the column to save space. However, it is also possible to place it outside the column. This can be necessary, for example, if the liquid is always very hot and is to be cooled by the outside air. In this case, it is wise for it to be located outside the column. This is also beneficial if the condensate should be viscous or contain larger amounts of solid matter rendering periodical cleaning of the pipes essential.

The pipe can also be fitted with filling or draining devices to enable the pipe to be cleaned, filled or emptied. If the pipe(s) is/are located outside the column, they can be arranged for easy access. The pipes with filling or draining devices can also be arranged such that they can fill or drain pipes located in the column. The communicating pipes can also be fitted with devices for heating or cooling. These can, for example, be small cooling fins or electric heating elements.

The gas is fed into the chamber via gas inlet nozzles. In a favourable embodiment these feed the gas sideways into the chamber. The actual gas outlet can take any form. As the gas in the bottom chamber still contains large amounts of moisture, and as there is usually a larger water reservoir there, the gas inlet nozzle is preferably designed to allow the gas to be fed directly into the water reservoir. However, the gas inlet nozzle can also be in the form of a feed head or a hood with punctiform openings. Essentially, the feed head can take any form and it is recommended that it is designed to allow the gas to be fed optimally into the chamber, or into the condensate reservoir contained within the chamber. Furthermore, additional internals in the respective chamber can result in beneficial droplet separation and a reduction in the chamber height. These internals can, for example, be baffles or troughs.

The inlet nozzles on the connection pipes between the chambers which determine the height of the liquid reservoir in the respective chambers can take any form. They can be equipped with a spout or with a funnel. However, they can also be bent or fitted with a valve. The outlet nozzles on the connection pipes can also take any form. They can have a simple form, such as a U-bend, or can be fitted with a funnel or with a hood-shaped inlet with punctiform openings (like a shower head). The crucial thing is that they function as a physical connection between the chambers and are able to create hydrostatic connectivity.

The chamber floors can take any form. They can be sump-like tending upwards. They can also be bell-shaped tending downwards. The chambers can take any form within the column. Preferably, they are situated within the column in order to ensure a space-saving construction. They can also be located outside the columns, particularly when spatial demands make this necessary. The individual chambers can be in the form of tanks, or can be in the form of a side protrusion which forms a tank. In general though, the column in its standard embodiment has a conical construction to ensure the easy moulding of a pressure-retaining shell. If one of the chambers is located outside the column, it can also be surrounded by a pressure-retaining shell. The chambers themselves can have different profiles. The user of the invention can decide how high the chamber should be. It is also possible for the physical connections between the chambers or the pipes to have different profiles.

To ensure a regulated gas flow in the column, the gas line or the interior of the chambers can be fitted with gas-regulating devices. These can, for example, be static mixers. They can also be control valves or gas pumps or can even include vacuum pumps. In general, pressure-changing elements, such as pumps, valves or thermostats can form part of the invention at any point within it. In addition, devices to regulate the gas flow, liquid precipitation or mass or heat exchange can also be found at any point within the invention. These can be baffles or troughs, for example.

A claim is made for a process in which the gas can be dried using the apparatus according to the invention. A claim if made in particular for a process to dry the gas characterised in that:

the gas is first fed into the side of a column which is surrounded by a pressure-retaining vessel and which comprises several chambers, with the gas first entering the bottom chamber where it is already cooled on arrival, or is cooled down, releasing part of its moisture content through condensation, and the bottom chamber being filled with a liquid bath into which the reducing gas can be fed, the liquid level of this liquid bath being regulated by the position of the valve for the lower liquid outlet. The dried gas can then be discharged via a gas outlet, the gas from this outlet entering a further device in which it is cooled even further before entering the second chamber which is above the first chamber, where it releases further moisture through condensation before being fed to a further application via a gas outlet nozzle in the second chamber, with the liquid in the second or higher chamber being able to run into a lower chamber via a hydrostatic liquid column or a siphon-like, physical connection which can be filled with liquid.

The process is designed such that the gas is preferably discharged sideways out of the bottom chamber without the gas entering the chamber above. Once it has been conducted out of the column, it is cooled further in a cooling device. Once it has been cooled, it enters the next chamber where it releases moisture, as dictated by the prevailing conditions. This makes it possible to feed the gas through two chambers situated on top of each other so that it can be cooled in two sequential steps, enabling it to release its moisture through condensation. It is also possible to feed the gas through three chambers situated on top of each other so that the gas is cooled in three sequential stages, enabling it to release its moisture through condensation.

In principle, it is possible to send the gas through any amount of chambers if the apparatus has been arranged to allow this. The gas is discharged out of the side of the lower chambers. It is beneficial if the gas outlet nozzle in the upper chamber is in the roof of the pressure-retaining column. A pipe is then situated between the chambers and this pipe physically connects the chambers and regulates the liquid level in the chamber above through the height of the inlet nozzle. The height of the liquid level can, however, also be regulated using other devices, such as valves or pumps. The pipe can traverse one or several unconnected chambers so that, for example, in a construction with three chambers the liquid is fed from the top chamber into the bottom chamber.

Synthesis gas and hydrogen which has been produced from synthesis gas are both suitable as reducing gases for drying. Carbon monoxide, coke oven gases and hydrocarbon fractions from refineries are all suitable as reducing gases for drying. Examples are $C_3$ or $C_4$ fractions from crude oil rectification. In principle, every gas that can be dried by cooling is suitable for use in the process according to the invention. For example, even corrosive gases can be dried in the apparatus according to the invention if the process equipment is designed accordingly, using a resistant construction material, for example.

The condensate which accumulates during the drying process can be collected in a common receiver and/or fed into a common tank. The condensate can then be disposed of or used as desired. This means that in a beneficial embodiment the condensate can be fed back into the process to produce gas for industrial use. However, it can also be used in subsequent processes or for steam generation once it has been scrubbed.

In order for the liquid in the gas to be condensed out, the gas must be cooled between the individual chambers. Any number of devices are suitable for this purpose. Although, in principle, it is possible to cool the gas directly upstream of or in the pressure-retaining column, it is beneficial for the gas to be fed via pipelines to the cooling device. In principle, it is also possible to heat the gas if the outside temperature requires it. In this case a heating device is located at the appropriate point. It is also possible to condense non-aqueous liquids if suitable cooling devices are located at the appropriate point. The process is preferably used to remove water from gases. A typical embodiment is the removal of moisture from synthesis gas.

Standard air coolers with cooling fins or water coolers can be used to cool the synthesis gas between the individual chambers. The hot synthesis gas can, however, also be used to heat the boiler feed water or feed gas. Heat exchangers can be placed in the synthesis gas pipeline between the chambers for this purpose.

The temperature of the synthesis gas during the first condensation stage in the first chamber should preferably be 100 to 200° C. at a pressure of 10 to 50 bar. Partial condensation already begins here depending on the pressure level and saturation. After the cooling process, which can be effected using air, the gas is fed into the second chamber. Here, the gas then has a temperature of 50 to 70° C. Further cooling and condensation can take place using a water cooler, for example. Synthesis gas with a temperature of 30 to 70° C. at standard pressure is then obtained. Under these conditions the water usually condenses to a residual content of 0.1 mass percent. Further drying is then possible using refrigerating machines, for example, but any conditions can prevail as long as optimal drying can be achieved.

The gradual cooling means that the by-products from the synthesis gas production are effectively expelled. Therefore, in an ideal case the synthesis gas does not need to be purified by means of steam stripping. As there is no back-mixing of the condensates, the by-products of the synthesis gas production can be discharged in the process condensate. As these by-products are usually ammonia, carbon dioxide and methanol, which occur as gases at the prevailing temperatures, back-mixing with the synthesis gas produced is not possible.

The invention offers the advantage of an apparatus which dries a process gas gradually at different pressures and temperatures without undesirable gas flow occurring through the gas and condensate pipes. The construction according to the invention allows a column, which is suitable for gradual condensing out of process condensate, to be built as one component to save space. The design of the pipe connection between the chambers dispenses with the need for gas flow-regulating devices, such as pumps and regulating valves. This results in low overall investment costs. The invention also offers the advantage of being able to discharge process condensates at a high temperature if a suitable process condensate channel is present.

Figure 1:
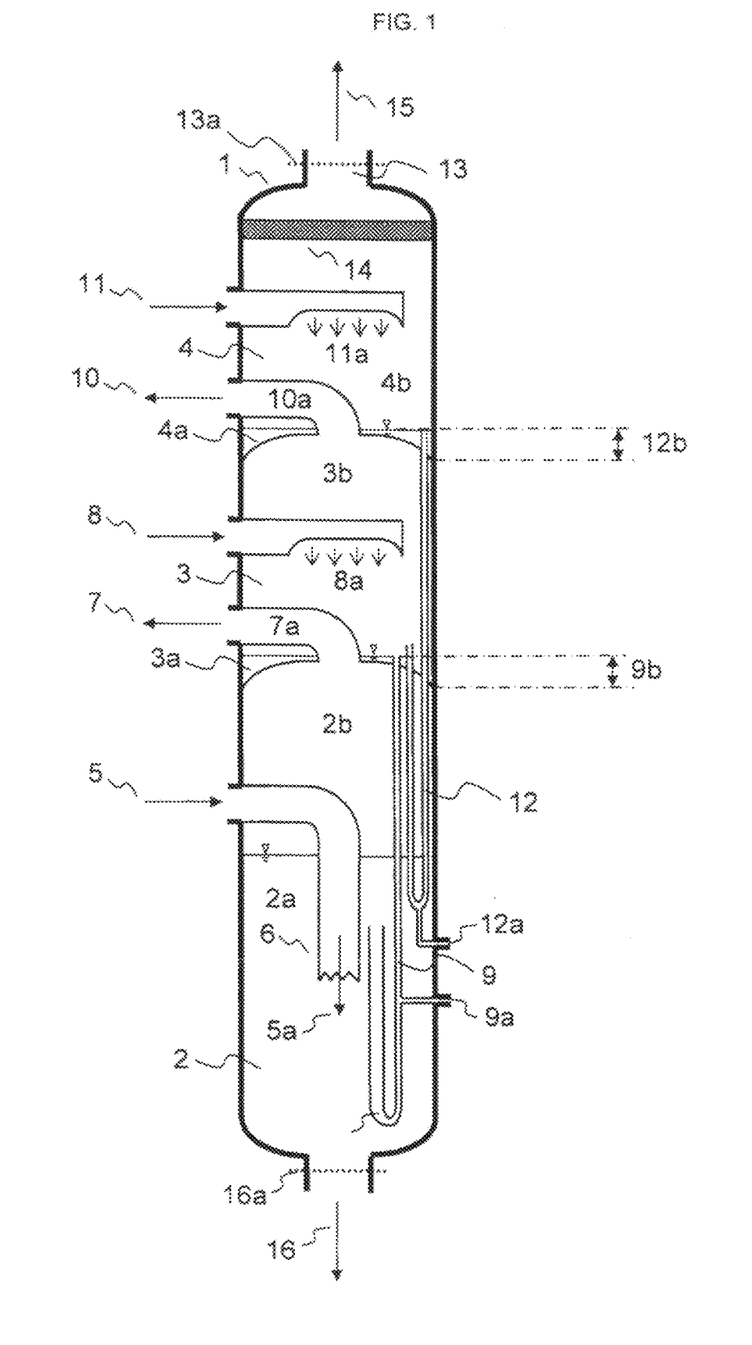
FIG. 1 shows an embodiment of a column with a pressure-retaining shell and three condensation chambers.
Figure 2:
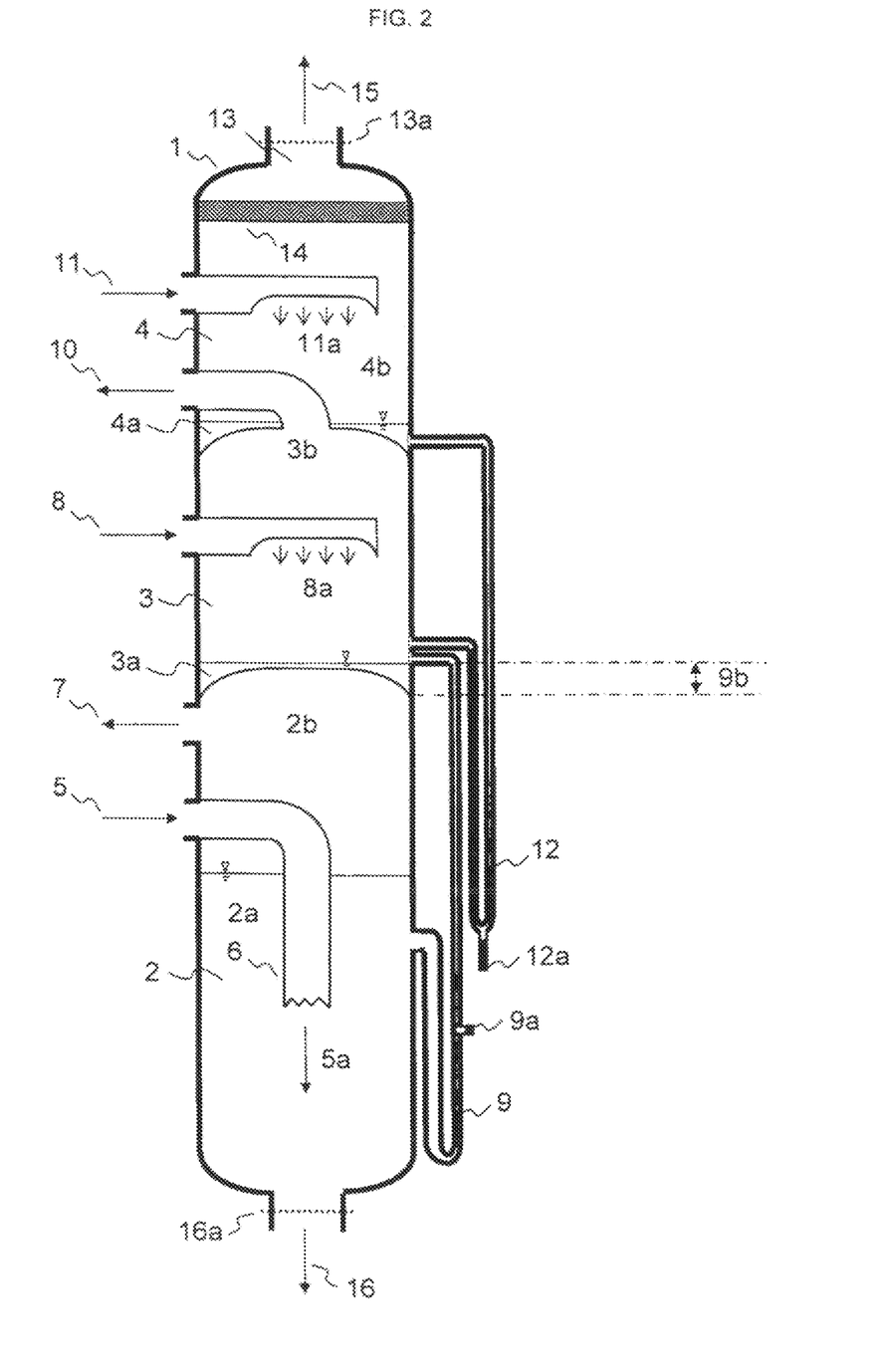
FIG. 2 shows an embodiment of a column with a pressure-retaining shell and three condensation chambers.
Figure 3:
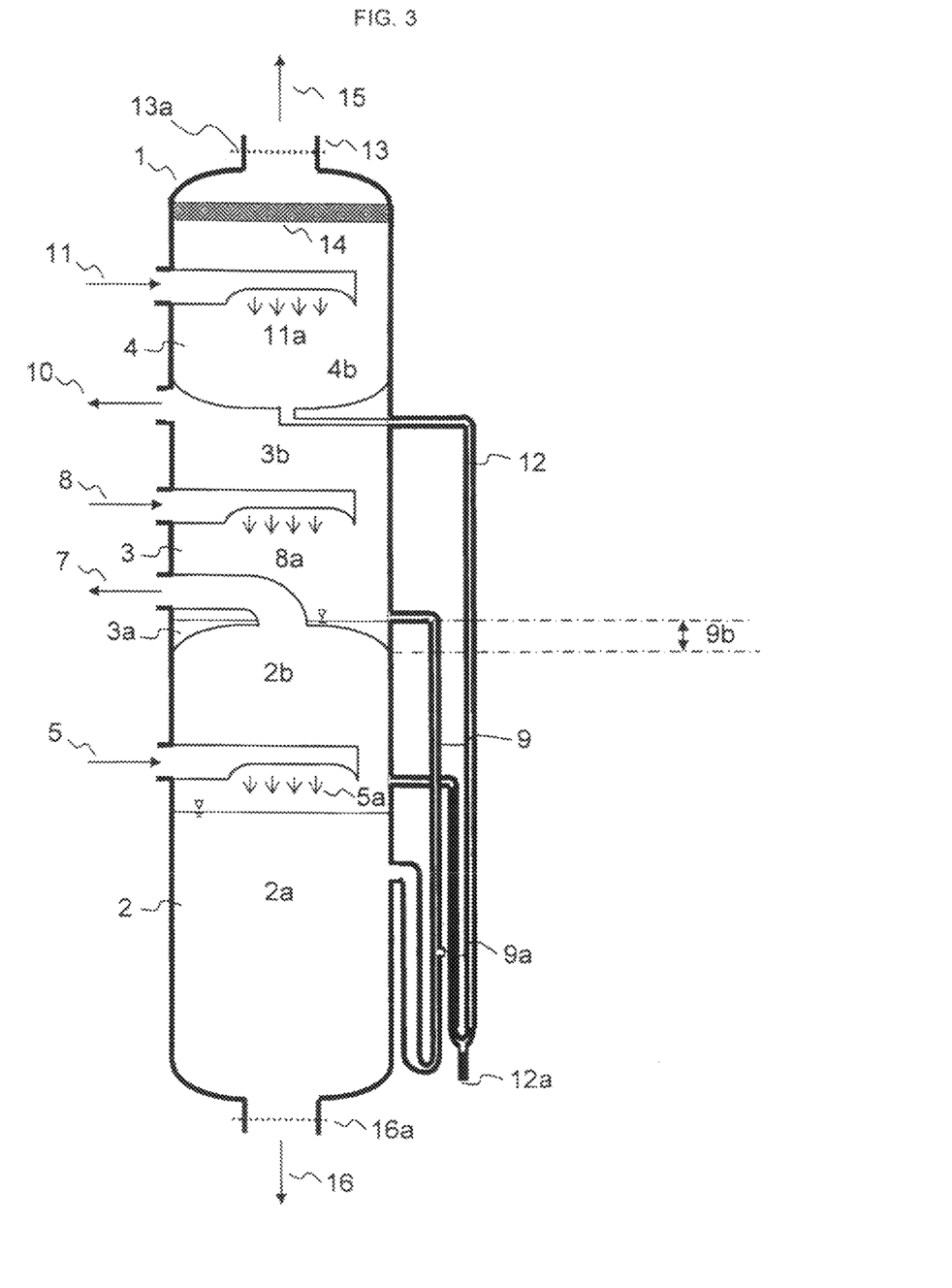
FIG. 3 shows an embodiment of a column with a pressure-retaining shell and three condensation chambers.
Figure 4:
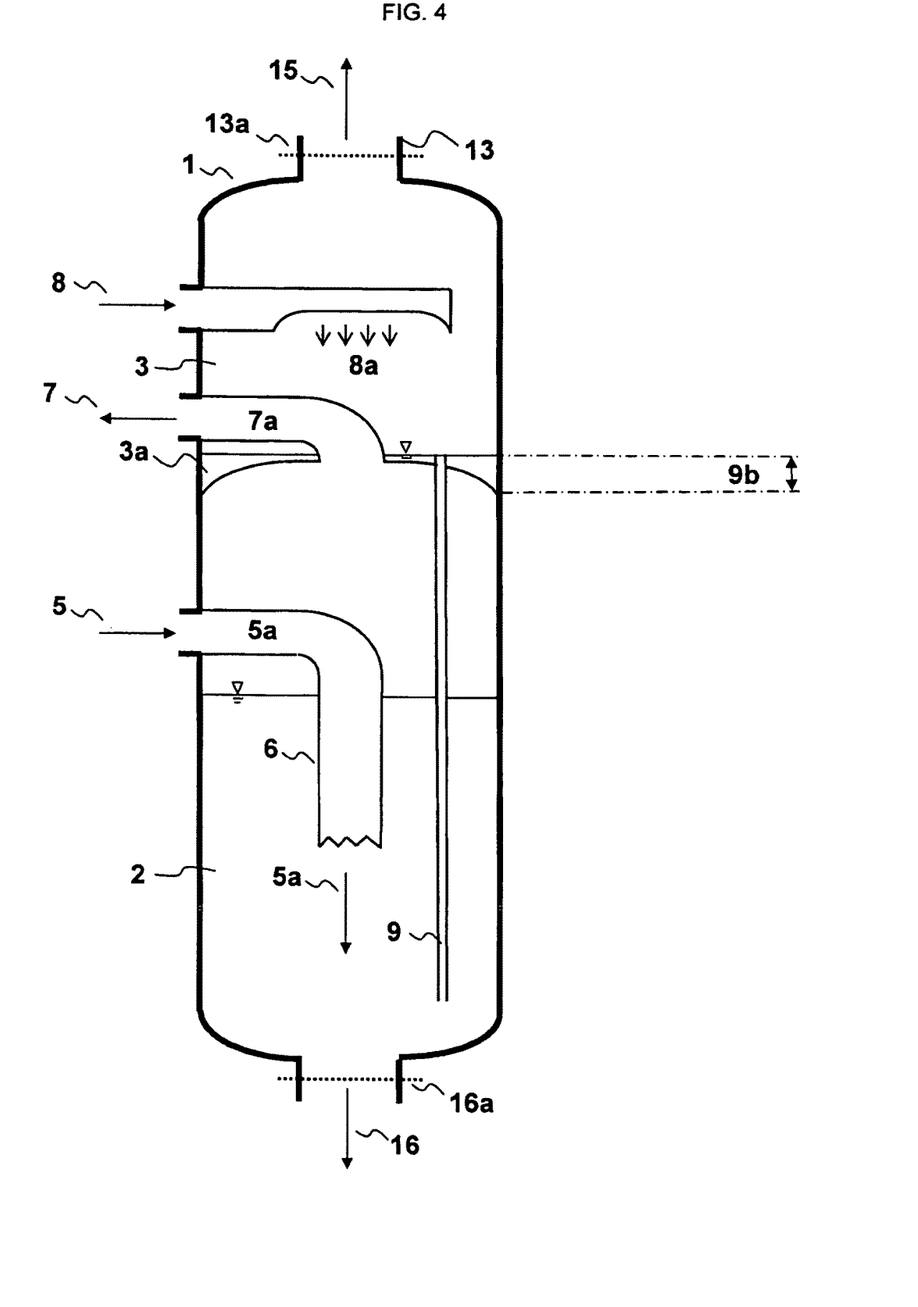
FIG. 4 shows an embodiment of a simple column with a pressure-retaining shell and two condensation chambers.
Figure 5:
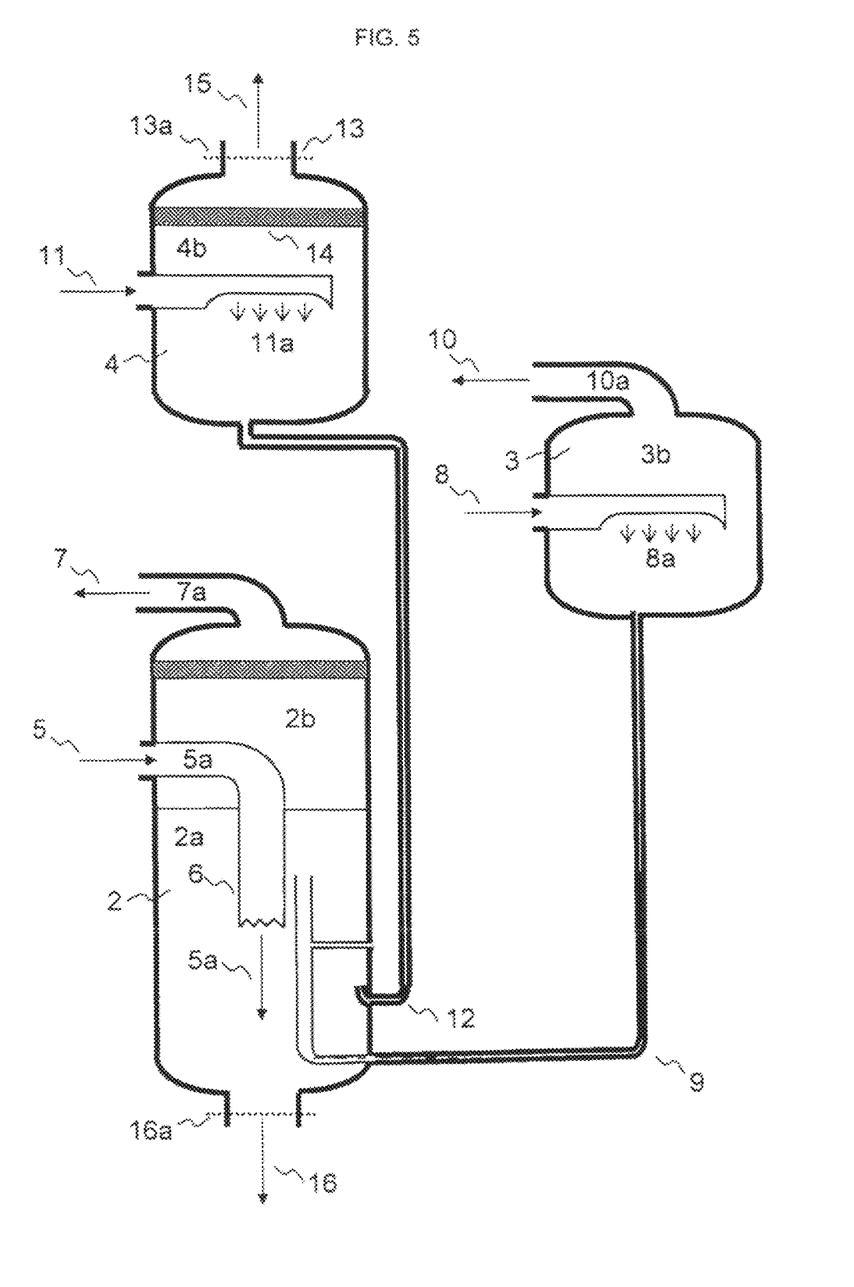
FIG. 5 shows an embodiment of a column without a pressure-retaining shell and with three condensation chambers.
Figure 6:
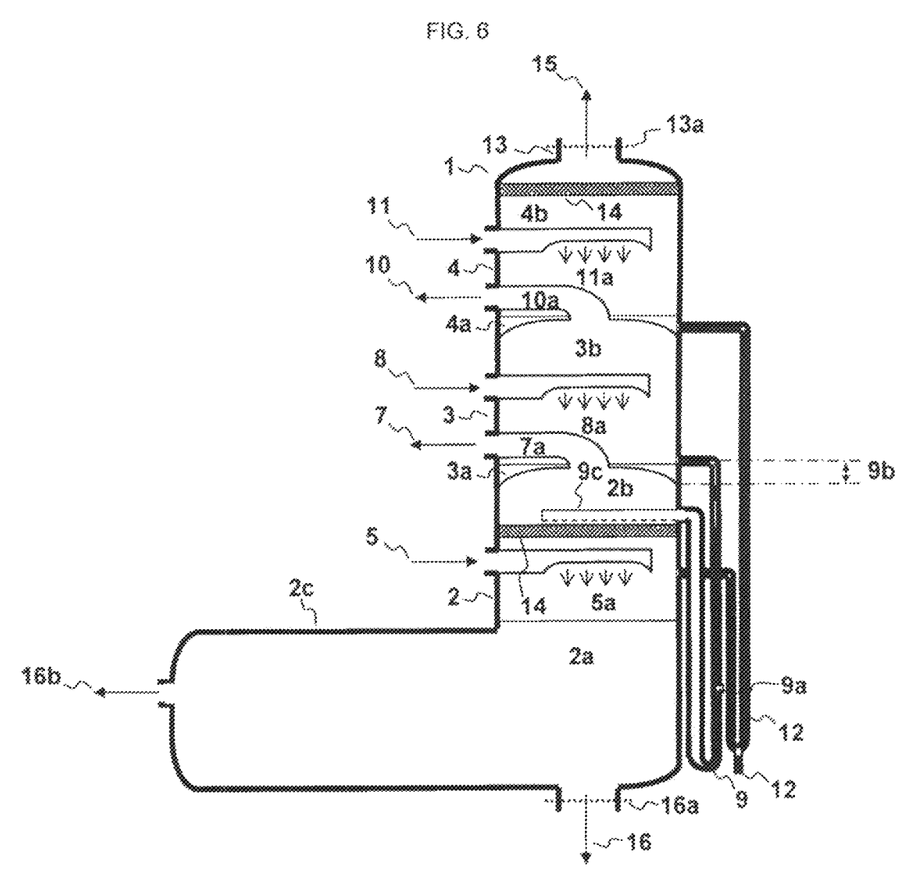
FIG. 6 shows an embodiment of a column with a pressure-retaining shell and three condensation chambers.
Figure 7:
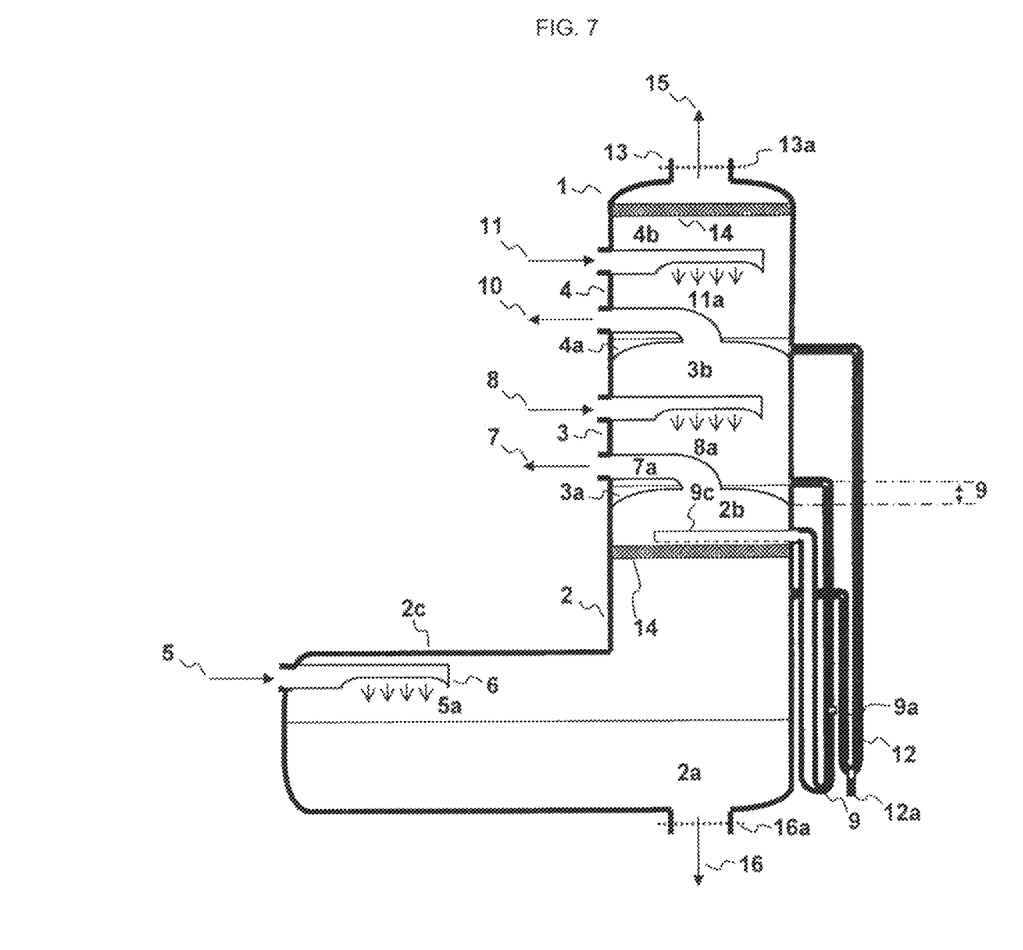
FIG. 7 shows an embodiment of a column with a pressure-retaining shell and three condensation chambers.

The invention's embodiment of an apparatus for the gasification of fuels is described in more detail using seven diagrams, although the process according to the invention is not restricted to these embodiments. FIG. 1. shows an apparatus according to the invention with three chambers and internal hydrostatic connecting pipes between the chambers. The synthesis gas is fed into the bottom chamber. FIG. 2 shows an apparatus according to the invention with three chambers and external hydrostatic connecting pipes between the chambers. FIG. 3 shows an apparatus according to the invention with three chambers and external hydrostatic connecting pipes between the upper chambers and the bottom chamber. FIG. 4 shows an apparatus according to the invention with two chambers and a simple hydrostatic connecting pipe between the two chambers. FIG. 5 shows an apparatus with three chambers whereby the middle chamber is positioned outside the pressure-retaining device. FIG. 6 shows an apparatus according to the invention with three chambers whereby the bottom chamber is designed with a side protrusion which acts as a tank to collect a large quantity of condensate. FIG. 7 shows an apparatus in accordance with the invention with three chambers whereby the length of the bottom chamber is used to improve droplet separation.

FIG. 1 outlines, by way of example, a column (1) with a pressure-retaining shell and three condensation chambers (2,3,4). The bottom chamber (2) is used to introduce the hot synthesis gas (5). The chamber houses a reservoir with condensate (2a), into which the hot synthesis gas is introduced via a gas inlet nozzle (6). After flowing through the condensate reservoir the gas enters the condensation chamber (2b). Once the liquid has been condensed out, the gas is fed out of the first chamber (7) via the gas outlet nozzle (7a). Once the gas has left the first chamber, it is cooled and fed (8a) into the second chamber (3) via the gas inlet nozzle (3). Here the gas releases more condensate so that additional condensate (3a) collects on the floor of the second chamber. A pipe (9) is located between the first and the second chamber and this pipe forms a hydrostatic liquid column. This allows liquid to flow back into the first chamber without gas overflowing from the first chamber into the second. The pipe has an opening for filling, cleaning and draining (9a). The height of the liquid level in the second chamber (9b) can be determined by the height of the inlet nozzle of the pipe (9). Once more liquid has been condensed in the second chamber, the gas is fed out sideways though the chamber roof (10). It is then fed through another cooling device (not shown). Then (11a) the gas flows though another gas inlet nozzle (11) into the third chamber (4). A reservoir of condensate (4a) is formed here, too, due to the condensation. The condensation of the water causes the gas to release its residual water (4a) as dictated by the condensation conditions in this chamber. There is also a pipe (12) between the second and third chambers which forms a hydrostatic liquid column. This allows liquid to flow back into the first chamber without gas overflowing from the second into the third chamber. The pipe also has an opening for filling, cleaning and draining (12a). The height of the liquid level (12b) in the third chamber can be determined by the height of the inlet nozzle of the pipe (12). Once the remaining liquid has been condensed, the dried gas is fed out (13) via a nozzle (13a) and flows first through a droplet separator (14). Dried synthesis gas is obtained (15). The condensate can be fed out (16) at the bottom nozzle, for example through a valve spout (16a).

FIG. 2 outlines, by way of example, a column with a pressure-retaining shell (1) and three condensation chambers (2,3,4). The bottom chamber (2) is used for the initial drying of the hot synthesis gas. In this case, the pipes (9,12) which serve as hydrostatic liquid columns are attached outside between the chambers of the column so that they are more easily accessible. This also enables the liquid columns to be heated or cooled, as required. Raw gas is fed into the bottom chamber (2) via the inlet nozzle (5). The dried synthesis gas (15) is removed via the top gas outlet (13). The condensate can be fed out (16) at the bottom nozzle, for example through a valve spout (16a).

FIG. 3 outlines, by way of example, a column with a pressure-retaining shell (1) and three condensation chambers (2,3,4). The bottom chamber (2) is used for the initial drying of the hot synthesis gas. In this case, the pipes (9,12) which serve as hydrostatic liquid columns are attached outside between the chambers of the column so that they are more easily accessible. The top condensation chamber (4) has a floor which is designed as a sump. This means that a liquid reservoir does not form in this chamber. The condensate flows through the pipe (12) directly into the bottom chamber (2). Raw gas is fed into the bottom chamber (2) via the inlet nozzle (5). The dried synthesis gas (15) is removed via the top gas outlet (13). The condensate can be fed out (16) at the bottom nozzle, for example through a valve spout (16a).

FIG. 4 outlines, by way of example, a simple column with a pressure-retaining shell (1) and two condensation chambers (2,3). The bottom chamber (2) is used for the initial drying of the hot synthesis gas. There is a simple connection (9) between the two chambers. The height of the reservoir (9b) in the top chamber (3) can be determined by the height of the inlet nozzle of the pipe (9). Because the pipe (9) is not in the form of a siphon, it must be sufficiently immersed in the liquid reservoir of the bottom chamber (2) to prevent gas from overflowing from the bottom chamber (2) into the top chamber (3). Raw gas is fed into the bottom chamber (2) via the inlet nozzle (5). The dried synthesis gas (15) is removed via the top gas outlet (13). The condensate can be fed out (16) at the bottom nozzle, for example through a valve spout (16a).

FIG. 5 outlines, by way of example, a column without a pressure-retaining shell (1) and with three condensation chambers (2,3,4). The bottom chamber (2) is used for the initial drying of the hot synthesis gas. The chambers are not located in a column but rather are separate to each other. Raw gas is fed into the bottom chamber (2) via the inlet nozzle (5). The dried synthesis gas (15) is removed via the top gas outlet (13). The condensate can be fed out (16) at the bottom nozzle, for example through a valve spout (16a).

FIG. 6 outlines, by way of example, a column with a pressure-retaining shell (1) and three condensation chambers (2,3,4). The bottom chamber (2) is used for the initial drying of the hot synthesis gas. In this case, the pipes (9,12), which serve as hydrostatic liquid columns, are attached outside between the chambers of the column so that they are more easily accessible. The bottom chamber has a side protrusion (2c) which acts as a tank so that larger quantities of condensate can be collected. The condensate can also be discharged via a discharge outlet on the side (16b). Discharge from the bottom pipe (9) takes place via a hood-like manifold (9c) to create intensive contact with the gas in the lower chamber. Raw gas is fed into the bottom chamber (2) via the inlet nozzle (5). The dried synthesis gas (15) is removed via the top gas outlet (13). The condensate can be fed out (16) at the bottom nozzle, for example through a valve spout (16a).

FIG. 7 outlines, by way of example, a column with a pressure-retaining shell (1) and three condensation chambers (2,3,4). The bottom chamber (2) is used for the initial drying of the hot synthesis gas. In this case, the pipes (9,12), which serve as hydrostatic liquid columns, are attached outside between the chambers of the column so that they are more easily accessible. The bottom chamber has a side protrusion (2c) to improve the droplet separation and to enable the overall height of the column to be reduced. Discharge from the bottom pipe (9) takes place via a hood-like manifold (9c) to create intensive contact with the gas in the lower chamber. The raw gas is fed into the bottom chamber (2) via the inlet nozzle (5) at the side in the lower section of the protrusion. This provides more space for condensation to take place. The dried synthesis gas (15) is removed via the top gas outlet (13). The condensate can be fed out (16) at the bottom nozzle, for example through a valve spout (16a).

LIST OF REFERENCE NUMBERS AND DESIGNATIONS

1 Column with pressure-retaining shell
2 First chamber or condensation chamber
2a Reservoir for condensate in the first condensation chamber
2b Gas compartment in the first condensation chamber
2c Tank-like protrusion in the first condensation chamber
3 Second condensation chamber
3a Reservoir for condensate in the second condensation chamber
3b Gas compartment in the second condensation chamber
4 Third condensation chamber
4a Reservoir for condensate in the third condensation chamber
4b Gas compartment in the third condensation chamber
5 Gas inlet in the first condensation chamber
5a Gas inlet flow in the first condensation chamber
6 Gas inlet nozzle for the raw gas
7 Gas outlet from the first condensation chamber
7a Gas flow from the first condensation chamber
8 Gas inlet in the second condensation chamber
8a Gas inlet flow in the second condensation chamber
9 Hydrostatic liquid column between the first and second condensation chambers
9a Opening for filling, cleaning and draining the hydrostatic liquid column between the first and second condensation chambers
9b Height of the liquid column in the second condensation chamber
9c Gas inlet in the hydrostatic liquid column as a hood with punctiform openings
10 Gas outlet from the second condensation chamber
10a Gas flow from the second condensation chamber
11 Gas inlet in the third condensation chamber
11a Gas inlet flow in the third condensation chamber
12 Hydrostatic liquid column between the second and third condensation chambers
12a Opening for filling, cleaning and draining the hydrostatic liquid column between the second and third condensation chambers
12b Height of the liquid column in the third condensation chamber
13 Gas outlet for the dried gas
13a Valve
14 Demister or droplet separator
15 Effluent dried gas
16 Outlet for the condensate
16a Valve
16b Discharge of the condensate or feed for other media

The invention claimed is:

1. A device for cooling a gas which is formed by a column surrounded by a pressure shell, comprising:
a column comprising at least two different chambers;
the first, bottom chamber being closed at the bottom by an outlet which can be shut off by a valve, thus allowing a bath with liquid to be installed in this chamber;
the first, bottom chamber also comprising a side inlet for the reducing gas; and
the first, bottom chamber being closed at the top by a chamber roof and having a gas outlet; and
the second, upper chamber being closed at the bottom by the chamber roof of the first chamber;
the upper chamber having another side gas inlet and being closed at the top by an outlet for synthesis gas; wherein
the chambers are configured so that it is possible to heat these chambers to different temperature levels and to pressurize or create a vacuum in these chambers such that different pressure levels can be set; and
a hydrostatic liquid column or a siphon-like physical connection, which can be filled with liquid, is disposed between the chambers.

2. The device according to claim 1, wherein:
the second chamber of the column is closed at the top by another chamber roof; and
a third chamber is adjoined via this chamber roof; wherein
the second chamber has a gas outlet for the reducing gas to discharge said gas from the second chamber, the third chamber is closed at the top by an outlet for the synthesis gas and a hydrostatic liquid column or a siphon-like physical connection, which can be filled with liquid, is integrated between the second and third chambers.

3. The device according to claim 2, wherein a hydrostatic liquid column or a physical connection, which can be filled with liquid, is integrated between the first and third chambers.

4. The device according to claim 2, wherein:
the third chamber of the column is closed at the top by another chamber roof;
another chamber or any number of chambers are adjoined via this chamber roof; wherein
the other chamber has a gas outlet for the reducing gas, which discharges the gas from the chamber;
the top chamber is closed at the top by an outlet for the synthesis gas; and a hydrostatic liquid column or a siphon-like physical connection, which can be filled with liquid, is integrated between the third and the other chamber or chambers.

5. The device according to claim 4, wherein a cooling device is located in one or more pipelines between at least two of the chambers.

6. The device according to claim 5, wherein the cooling device used is an indirect air or water cooler.

7. The device in accordance with claim 1, wherein a cooling device is located in one or more chambers.

8. The device according to claim 7, wherein the cooling device used is a refrigerating machine or a refrigerating machine aids the gas cooling process.

9. The device according to claim 1, wherein the top chamber has a demister or droplet separator in front of the upward-facing gas outlet.

10. The device according to claim 9, wherein the hydrostatic liquid column or the siphon-like physical connection within the column connects the individual consecutive or next but one chambers.

11. The device accord to claim 9, wherein the hydrostatic liquid column or the siphon-like physical connection outside the column connects the individual consecutive or next but one chambers.

12. The device according to claim 10, wherein at least one of the siphon-like devices has an opening for filling and draining.

13. The device according to claim 10, wherein the gas inlet nozzle on the siphon-like device is designed as a hood with punctiform openings.

14. The device according to claim 1, wherein at least one of the chamber roofs protrudes upwards to form a bell shape.

15. The device according to claim 14, wherein at least one of the bell floors protrudes downwards to form a sump.

16. The device according to claim 1, wherein at least one of the chambers is located outside the pressure shell surrounding the column.

17. The device according to claim 1, wherein at least one gas inlet pipe is bent downwards so that it can serve as an immersion pipe under a liquid level, and feeds the gas flow under the liquid level.

18. The device according to claim 1, wherein another demister or droplet separator is located between the gas inlet of a chamber and the gas outlet.

19. The device according to claim 1, wherein the bottom chamber of the column is in the form of a side-protruding tank.

20. The device according to claim 1, comprising a static mixer inside.

21. The device according to claim 1, wherein the floors and/or pipes between the chambers are thermal insulation in whole or in part.

22. The device according to claim 1, wherein construction of the chambers allows the height of the individual chambers to be selected to advantageous effect.

23. A process for drying a gas, comprising:
feeding the gas into the side of a column which is surrounded by a pressure-retaining vessel and which comprises several chambers, with the gas first entering the bottom chamber where it is already cooled on arrival, or is cooled down, releasing part of its moisture content through condensation;
feeding the reducing gas into the bottom chamber which is filled with a liquid bath, the liquid level of this liquid bath being regulated by the position of the valve for the lower liquid outlet;
discharging the dried gas via a gas outlet; and
sending the gas from this outlet to a further device in which it is cooled even further before entering the second chamber which is above the first chamber, where it releases further moisture through condensation before being fed to a further application via a gas outlet nozzle in the chamber roof of the second chamber; wherein
the liquid in the second or higher chamber can run into a lower chamber via a hydrostatic liquid column or a siphon-like, physical connection which can be filled with liquid.

24. The process according to claim 23, comprising:
subsequent to the gas being dried in the second chamber, it is discharged via gas outlet nozzles; and
subsequently cooled and fed into a third chamber in which it releases more moisture through condensation before being fed out through a gas outlet nozzle in the third chamber; wherein
a hydrostatic liquid column or a siphon-like physical connection, which can be filled with liquid, is integrated between an optional number of the chambers.

25. The process according to claim 24, comprising:
subsequent to the gas being dried in the third chamber it is discharged via a gas outlet nozzle; and
subsequently cooled and fed into another or any number of other chambers, in which it releases more moisture through condensation before being fed out through a gas outlet nozzle in the third chamber or other chambers; wherein
the third chamber or other chambers is connected via a hydrostatic liquid column or a siphon-like physical connection.

26. The process according to claim 23, wherein the gas is a synthesis gas which is produced by means of a steam reforming process.

27. The process according to claim 23, wherein the condensed water formed during the process is fed back into the synthesis gas production process.

28. The process according to claim 23, wherein the gas between the individual chambers is cooled.

29. The process according to claim 23, wherein the pressure and temperature in the individual chambers of the drying device vary.

30. The process according to claim 23, wherein the raw gas is fed into the apparatus for drying at a temperature of 100 to 200° C.

31. The process according to claim 23, wherein the dried gas is removed from the apparatus for drying at a temperature of 30 to 70° C.

32. The process according to claim 23, wherein the raw gas is fed into the apparatus for drying at a pressure of 10 to 50 bar.

* * * * *

UNITED STATES PATENT AND TRADEMARK OFFICE
CERTIFICATE OF CORRECTION

PATENT NO. : 8,647,414 B2 Page 1 of 1
APPLICATION NO. : 12/736372
DATED : February 11, 2014
INVENTOR(S) : Von Trotha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Twenty-ninth Day of September, 2015

Michelle K. Lee
*Director of the United States Patent and Trademark Office*